(12) United States Patent
Iellimo

(10) Patent No.: US 11,046,513 B2
(45) Date of Patent: *Jun. 29, 2021

(54) SECURELY TRANSPORTABLE PALLET TRANSPORTATION CART

(71) Applicant: FRAZIER INDUSTRIAL COMPANY, Long Valley, NJ (US)

(72) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,743

(22) Filed: Jan. 2, 2020

(65) Prior Publication Data

US 2020/0148473 A1 May 14, 2020

Related U.S. Application Data

(63) Continuation of application No. 15/935,289, filed on Mar. 26, 2018, now Pat. No. 10,589,929.

(51) Int. Cl.
*B65G 1/04* (2006.01)
*B65G 1/137* (2006.01)
*B66F 9/18* (2006.01)
*G05D 1/00* (2006.01)

(52) U.S. Cl.
CPC .......... *B65G 1/0492* (2013.01); *B65G 1/137* (2013.01); *B66F 9/182* (2013.01); *G05D 1/0011* (2013.01)

(58) Field of Classification Search
CPC .... B65G 1/065; B65G 1/0414; B65G 1/0492; B65F 9/182
See application file for complete search history.

(56) References Cited

U.S. PATENT DOCUMENTS

| 3,848,755 A | 11/1974 | Bussienne |
| 5,575,608 A | 11/1996 | Yau |
| 5,809,905 A | 9/1998 | John |
| 5,897,286 A | 4/1999 | Whittaker |
| 5,967,057 A | 10/1999 | Nakayama |
| 2016/0229630 A1 | 8/2016 | Gebhardt |

FOREIGN PATENT DOCUMENTS

| EP | 1103494 | 5/2001 |
| EP | 2778112 | 9/2014 |
| ZA | 2007/01254 | 2/2007 |

OTHER PUBLICATIONS

Machine translation of EP 1103494 from espacenet (also present in parent U.S. Appl. No. 15/935,289) (Year: 2001).*

(Continued)

*Primary Examiner* — Mark C Hageman
(74) *Attorney, Agent, or Firm* — Dilworth & Barrese, LLP

(57) ABSTRACT

A pallet cart including a mechanism to help secure the cart to a forklift. The cart can move through a warehouse with racks of goods and receive signals and store information about the inventory on the racks. The unit can be moved to another location with a forklift. The security mechanism can comprise one or more magnets, retractable structures or other structures to secure the cart to the steel fork of a forklift during transport.

21 Claims, 7 Drawing Sheets

(56) References Cited

OTHER PUBLICATIONS

Pallet mole website from Feb. 28, 2017 from https:/web.archive.org.web/20170228020405/htpps://www.frazier.com/storage-solutions/the-pallet-mole/, (year 2017).
Pallet mole video from htpps:www.youtube.com/watch?v=hh24-NGYmWY. (Year 2008).
Automated Pallet Mole video https://www.youtube.com/watch?v=_GdT19vEFyo, Mar. 6, 2017.
Pallet Shuttle video, https://www.youtube.com/watch?v=kYmfxFinDBA, Feb. 24, 2016.
Pallet Shuttle video, https://www.youtube.com/watch?v=qllw4XAa5Ng, Apr. 8, 2015.
Pallet Mole video, https://www.youtube.com/watch?v=hh24-NGYmWY, Apr. 7, 2008.

* cited by examiner

SECURELY TRANSPORTABLE PALLET TRANSPORTATION CART

CROSS REFERENCE TO RELATED APPLICATIONS

This application claims priority to and is a Continuation of application Ser. No. 15/935,289, filed Mar. 26, 2018, the contents of which are incorporated herein in their entirety.

BACKGROUND

The present disclosure relates generally to robotic carts that can operate inside high density pallet storage racks to deliver and retrieve pallets and/or record information concerning goods stored in storage racks, such as the racks one might find in different types of warehouses ("pallet transportation carts").

Storage systems are used in warehouses, department stores, cold storage areas and other storage facilities to store containers of goods. Certain storage systems employ extensive multi-story storage rack systems, often called deep rack or high density storage, to store large amounts of a variety of different products. Due to the density of the storage area and the limited sight lines, it can be time consuming and present logistical problems to maintain accurate inventory records of the goods remaining in storage on the racks. Delivering and retrieving the goods to and from the racks can also be inconvenient.

Certain conventional storage systems employ systems comprising RFID (radio frequency identification) tags to identify individual pallets. Some storage systems use pallet transportation carts with data collection units having Programmable Logic Controllers (PLC) that travel under, next to or over the racks of pallets and record inventory information, such as information that may be associated with the RFID tags. In certain operations, the carts travel on tracks under the pallets and have platforms that can rise up and lift the pallets off the racks for delivery or removal to or from the racks.

Many of these pallet transportation carts are heavy, expensive and difficult to transport around what are often tight confines of storage areas. Often, pallet transportation carts are moved from location to location in a warehouse with a forklift. However, while forklifts are often constructed to move pallets, they are not often constructed for the convenient, safe transportation of pallet transportation carts.

Accordingly, a more satisfactory structure, system and method are needed to secure pallet transportation carts to a forklift, for more convenient and safe transportation of the carts. It is therefore desirable to develop an improved pallet transportation cart and system that overcomes deficiencies in the prior art.

SUMMARY

A pallet transportation cart having a mechanical or magnetic structure to secure a pallet transportation cart to a forklift is provided. The adherence or locking mechanism can comprise an electromagnet or a permanent magnet for magnetically adhering the cart to the steel fork of a forklift to help prevent it from slipping off the forklift during transport. Alternately, structures, such as pegs, can engage a forklift fork. For example, pegs can engage recesses on the forklift fork. Alternatively, pegs or elongated ribs, rails or bars can engage the outer sides of each fork. High friction material, such as a rubber sheet can be applied to the bottom of the cart to improve grip to the fork.

The electromagnets can be switched between an energized active magnetic condition wherein current flows through the magnet coils and the magnet applies magnetic attractive force; and a non-magnetic condition where no attractive force is exerted so that the unit can be removed easily from the fork. The switch can be activated automatically, e.g., when the pallet transportation cart senses that it was placed on the fork of a forklift, such as with magnetic steel detection switches or an optical (light sensing) device. The switch can also be automatically deactivated, such as when the pallet transportation cart senses it has been brought to its intended destination. The pallet transportation cart can also include optical or motion sensors to determine that it has been lifted by a forklift to activate the magnet. The unit can also be manually activated or manually deactivated.

Alternatively, or in addition to the magnetic system, pegs, bars, rails, ribs, hooks or other structures can be provided on the cart bottom or retractable structures can descend from the bottom of the pallet transportation cart and engage the tines of the forklift fork. In one embodiments of the invention, pegs descending from the bottom of the cart can engage holes in the forklift fork. In another embodiment of the invention, structures can extend on both sides or only the outside of each fork tine to prevent side-to-side slippage. By inclining the fork, gravity will keep the cart from slipping off the fork end. In another embodiment of the invention, high friction material, such as rubber sheeting, silicone sheeting or other high friction material can be included on the bottom of the cart to help prevent slippage.

The pallet transportation cart can also include permanent magnets, such as iron magnets, alnico magnets and rare earth magnets. The magnetic locking device can also include wedges and/or levers to displace the magnets away from the forklift forks, between an active lock position, wherein they magnetically adhere the data collector to a forklift and a release position, physically separated from the fork, wherein the data collector can be more easily removed from the forklift.

The pallet transportation cart can be mobile, but in other embodiments of the invention it can either be pushed or pulled, while others are self-propelled with an internal motor and drive wheels. The pallet transportation cart can be robotic, following optical or magnetic tracks on the floor or fixed tracks, to ensure that the cart follows an accurate path sufficiently near the storage racks to ensure the most accurate data collection and/or pallet identification and/or rack location identification.

Other objects, advantages and embodiments of the invention will be apparent from the specification and the drawings and the scope of the invention will be indicated in the claims.

BRIEF DESCRIPTION OF THE DRAWINGS

Throughout the specification, like reference numerals will be used to indicate similar elements.

DETAILED DESCRIPTION OF THE PREFERRED EMBODIMENTS

Figure 1:
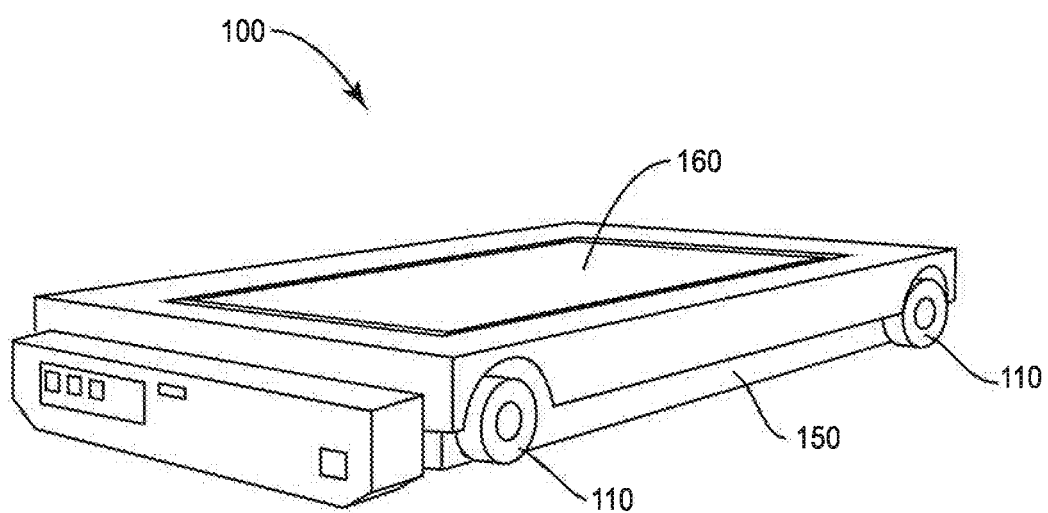
FIG. 1 is a perspective view of a pallet transportation cart, in accordance with a preferred embodiment of the invention.

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

A pallet transportation cart, optionally including a data collection unit, in accordance with preferred embodiments of the invention can include a magnetic or mechanical locking or adherence ("locking") mechanism to help secure the cart to a forklift fork. The locking mechanism can comprise one or more electromagnets or permanent magnets for magnetically securing the pallet transportation cart to the steel fork of a forklift. Alternatively, or to supplement the magnets, the pallet transportation cart can include pegs, rails, ribs, hooks or other structures on the bottom of the cart to engage the tines of a forklift fork to help secure the cart to the fork. These structures can be manually or automatically retractable. The fork can include recesses or other structures to engage structures on the cart. During transportation, the electromagnets can be switched between an energized active magnetic condition wherein the magnet applies magnetic attractive force between the unit and the forklift fork. The electromagnets can also be switched to a non-magnetic condition where no attractive force is applied, for ease or removal. The physical structure can be manually or automatically switched between an engaged or disengaged condition.

The switch on the electromagnet or the switch that causes the structures to descend from the cart can be activated automatically. For example, the unit can be provided with a sensor that senses that the unit has been placed on the fork of a forklift. Such a sensor can include optical, motion, magnetic, RF tag, bluetooth or other detectors for detecting close proximity to a forklift fork. The switch can also be automatically deactivated de-energizing the magnets or retracting the locking structures back into the cart. The unit can be provided with a sensor that detects (e.g., RFID detection) that it been brought to its intended destination. The magnetic lock can also be manually activated or manually deactivated either physically or electronically (e.g., wirelessly).

The pallet transportation cart can also include permanent magnets, such as iron magnets, alnico magnets and rare earth magnets. The permanent magnets can be fixed and the unit can be removed from the forklift fork with physical force. The magnetic security device can also include wedges and/or levers to displace the magnets and/or unit away from the forklift fork, between an active locked position, wherein they magnetically adhere the pallet transportation cart to a forklift and a released position, wherein the pallet transportation cart can be more easily removed from the forklift.

The pallet transportation cart can be mobile and preferably robotic. It can be pushed, pulled or self-propelled with an internal motor and drive wheels. Pallet transportation carts and the technology employed therewith are described in South African Pat. App. No. 2007/01254, the contents of which are incorporated herein by reference.

In an embodiment of the invention, the pallet transportation cart can be robotic, and follow a physical or virtual track as it moves along or under storage racks. The unit can have the shape of an elongated rectangular prism, with a length dimension in the direction of the track and a width direction orthogonal to the track. A platform can raise up from the top of the cart and lift a pallet off the pallet rack. The lifted pallet can then be transported by the pallet transportation cart. When the unit reaches the end of the track, a forklift positions the fork tines under the cart, typically along the length dimension. The magnets, pegs or other structures in the cart secure the cart to the fork as it is lifted from the track (or other location), transported and placed on a new track (or other location). The magnets can be electromagnets that are manually or automatically activated and deactivated. The pegs or other structures can be manually or automatically retracted into the cart. Preferably, the cart includes two or more magnets or rows of magnets, spaced to correspond with the dimensions of the fork, to help align the unit with the fork tines and properly locate the center of gravity of the cart between the two fork tines. Elongated rectangular magnets to align with the fork tines are preferred.

Data collection can comprise first zeroing a counter of a PLC, then counting and optionally identifying different RF tags on pallets, cartons or rack locations as the pallet transportation cart moves the data collection unit through the warehouse. The unit can then transmit the results to a receiver by RF, Bluetooth or the like or the results can be read with a wire or wireless connection. The cart can proceed through the warehouse, with the unit reading the tags on each pallet, or reading pallet location in the rack, until a specific pallet tag or rack location is located. The cart can then be positioned under the pallet and a platform can then be raised at the top of the cart, to lift and support the pallet and move it to a new location. In reverse sequence a pallet can be delivered to a rack location.

Reference will now be made in detail to the exemplary embodiments of the present disclosure, which are illustrated in the accompanying drawings.

A pallet transportation cart including a data collection and storage unit, in accordance with a preferred embodiment of the invention, is shown generally in FIG. 1 as a pallet transportation cart 100, having functional devices located within a chassis having a housing 150. Referring to FIGS. 1-7, housing 150 supports four wheels 110, designed to shuttle pallet transportation cart 100 along a track 200. Commonly, data collection unit 100 will have a weight of several hundred, often 800 pounds.

Pallet transportation cart 100 can have an RF transmitter/receiver within housing 150 for receiving and recording inventory information. For example, cart 100 can transmit an RF signal and receive an identification of the RF tags in the local vicinity. This will permit unit 100 to identify and/or count and record all the pallets 230 along track 200 on its route through the warehouse. Housing 150 can include USB, electric power and other connectors to power, operate and read data from cart 100. Pallet transportation cart 100 can be powered by a rechargeable battery, such as with a lithium ion battery. For example, pallet transportation cart 100 can have many of the same features, dimensions and components as are included in the Pallet Shuttle® robotic data collection and storage cart, available from Distribution Property Solutions, Inc. of Irvine Calif. and Franklin, Tenn.

If pallet transportation cart 100 is intended to move a pallet 230, it will proceed until it is positioned under the intended pallet. At that point, a platform 160 will be raised off the top of pallet transportation cart 100 and lift the intended pallet 230 of goods off the rack on which it had been resting. Pallet transportation cart 100 can then carry the selected pallet 230 to the desired location. Alternatively, pallet transportation cart 100 can carry a pallet of goods 230 until a desired location is identified. At that point, platform 160 is lowered and pallet 230 remains at the intended location in a pallet rack.

Pallet transportation cart 100 can include a programmable logic controller (PLC) with read/write data storage media, such as a flash drive, a data storage disk and the like for storing data.

The data is acquired by communicating with RF tags on products or otherwise communicating with computer systems to monitor inventory on the racks and send a signal to data storage unit 100, describing the state of the inventory in a plurality of cartons of products 210 stored on a plurality of racks 220 alongside or over track 200. By way of nonexclusive example, cartons 210 or the pallets themselves can include inventory tracking devices, such as RF devices (not shown), which may be read only or read/write devices, as a way to keep track of inventory.

As pallet transportation cart 100 travels along track 200 (or travels by other means as will be readily evident to those of ordinary skill in the art), it can read, store and record inventory data based on the inventory tracking devices associated with cartons 210. This method of keeping track of data storage can be used for cold storage, food and beverage processing and general bulk storage.

Figure 5:
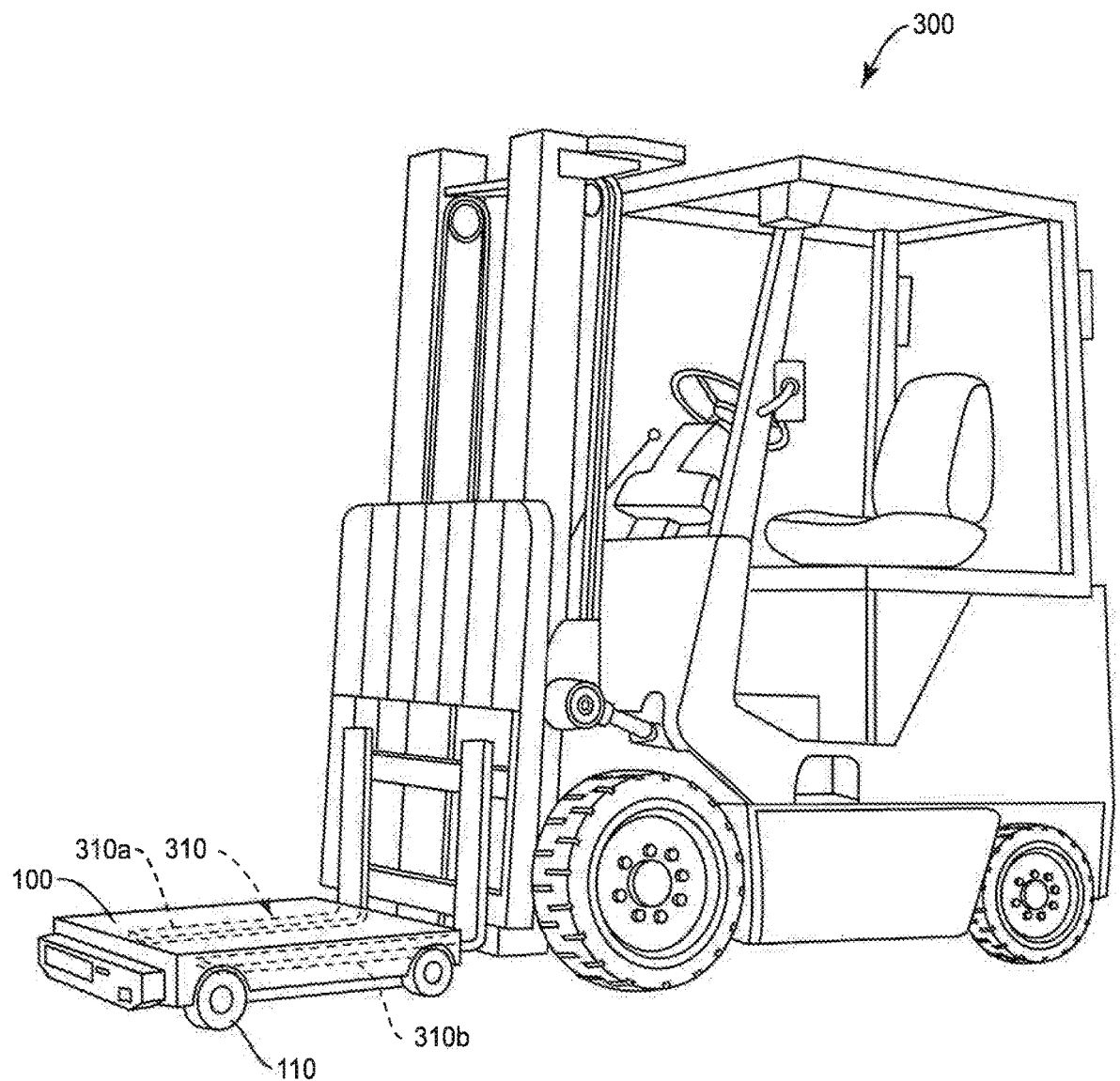
FIG. 5 is a perspective view of the pallet transportation cart FIG. 1, being moved by a forklift.

Referring to FIG. 5, pallet transportation cart 100 is conveniently moved by a forklift 300. Forklift 300 includes a metal fork 310 having two tines 310a and 310b. Pallet transportation cart 100 can be lifted and transported on fork 310. In one embodiment of the invention, with reference to FIGS. 4 and 5, forklift 300 can slip fork 310 under cart 100 and transport it to another track. Commonly, tines 310a and 310b of fork 310 are made of steel. To prevent data storage unit 100 from sliding off fork 310 during transportation, data storage unit 100 includes a magnetic security unit, to securely, magnetically adhere cart 100 to fork 310.

Figure 2:
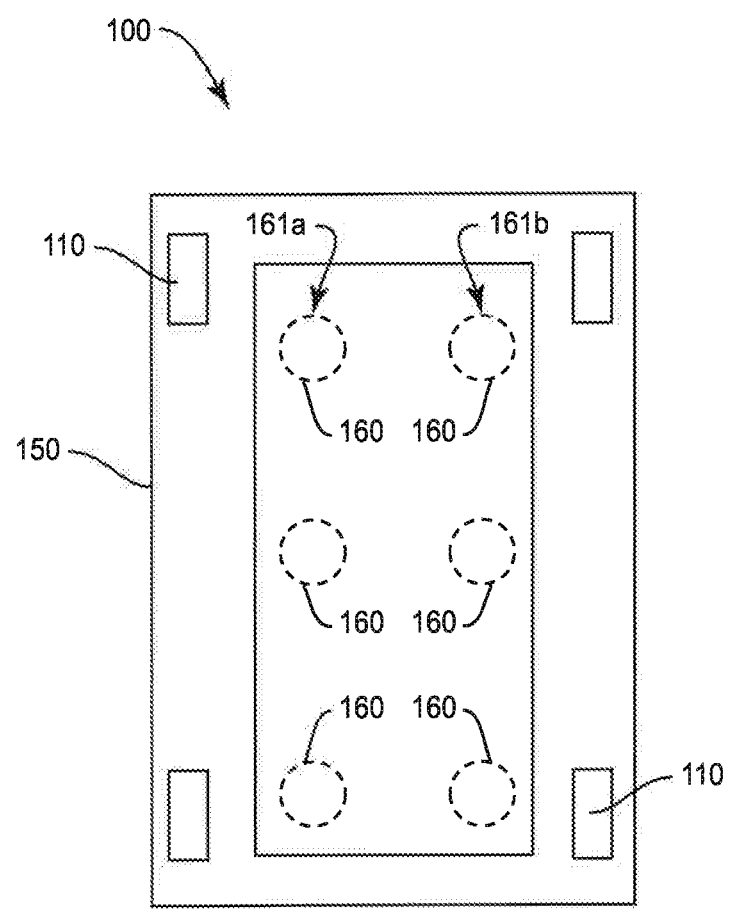
FIG. 2 is a bottom in view of the pallet transportation cart of FIG. 1.

In one embodiment of the invention, cart 100 includes two row shaped, e.g., elongated rectangular magnetic portions within housing 150, to correspond to tines 310a and 310b of fork 310. Referring to FIG. 2, two rows 161a and 161b of three electromagnets 160 each or single elongated magnets are installed within housing 150. Rows 161a and 161b are aligned with tines 310a and 310b of fork 310. This can help align the center of gravity of cart 100 between tines 310a and 310b. Alternatively, the magnetic portions can be arranged across the entire bottom surface of cart 100, to insure adhesion regardless of alignment.

In one embodiment of the invention, the magnets are located in a recess on the underside of cart 100 and are designed to float in that recess. For example, the magnets can be mounted on a rod and can be spring biased into the recess. In this manner, when not activated, the magnets can remain in the recess and will not interfere with cart function. However, when activated, the magnets will overcome any upward biasing force and descend downward from the recess until they contact the tines of the forklift fork. With this arrangement, greater flexibility is provided to still obtain direct contact between the magnets and forklift tines.

In another embodiment of the invention, the magnetic security unit employs at least one permanent magnet. Optionally, to disengage the magnetic lock unit, a lever or wedge can be manually or automatically used to increase the distance from the magnetic portion of the locking unit to fork 310. For example, an external lever can be used to manually separate the magnets in housing 150 from fork 310, such as by separating housing 150 from fork 310. Alternatively, a sensor, such as a metal sensor or optical sensor, can detect the presence of fork 310 under housing 150 and automatically activate an electromagnet to move the permanent magnet into position to adhere unit 100 to fork 310. For example, when the fork is placed under the cart 100, it will block an optical sensor, which will thereby activate the magnets.

When pallet transportation cart 100 arrives at its destination, the locking unit can be manually disengaged, by using a lever or wedge to move the magnetic portion of the locking unit away from fork 310. In another embodiment of the invention, pallet transportation cart 100 can sense it has reached its destination, such as by reading an RF or positioning device or optical sensor and automatically disengage the magnetic portion of the locking unit.

The strength of the magnetic attraction (magnetic coercivity or magnetic attraction force) between an activated magnetic device and fork 310 is important to ensure proper adherence of cart 100 to fork 310. In one embodiment of the invention, the magnetic attraction force should be sufficient to retain the cart on the smooth steel tines of a forklift fork, inclined at an angle of over 10°, preferably over 20°, more preferably over 30° to horizontal.

In an embodiment of the invention, the magnetic security unit of the pallet transportation cart is shielded from the storage media in the unit, so as not to interfere with the storage of data. Accordingly, either the magnet or the storage device should be properly shielded in ways known to those in the art.

Figure 3:
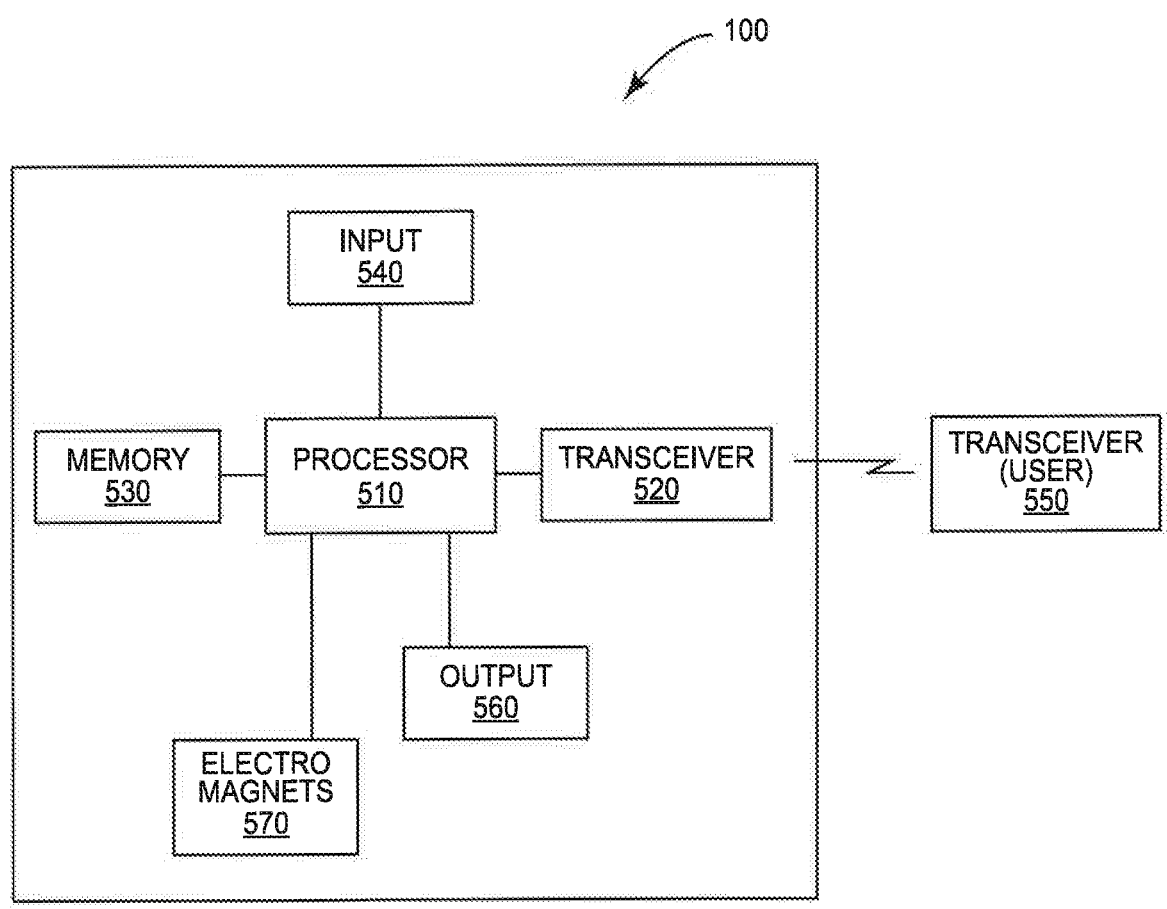
FIG. 3 is a block diagram of the electronics controlling the pallet transportation cart of FIG. 1.
Figure 4:
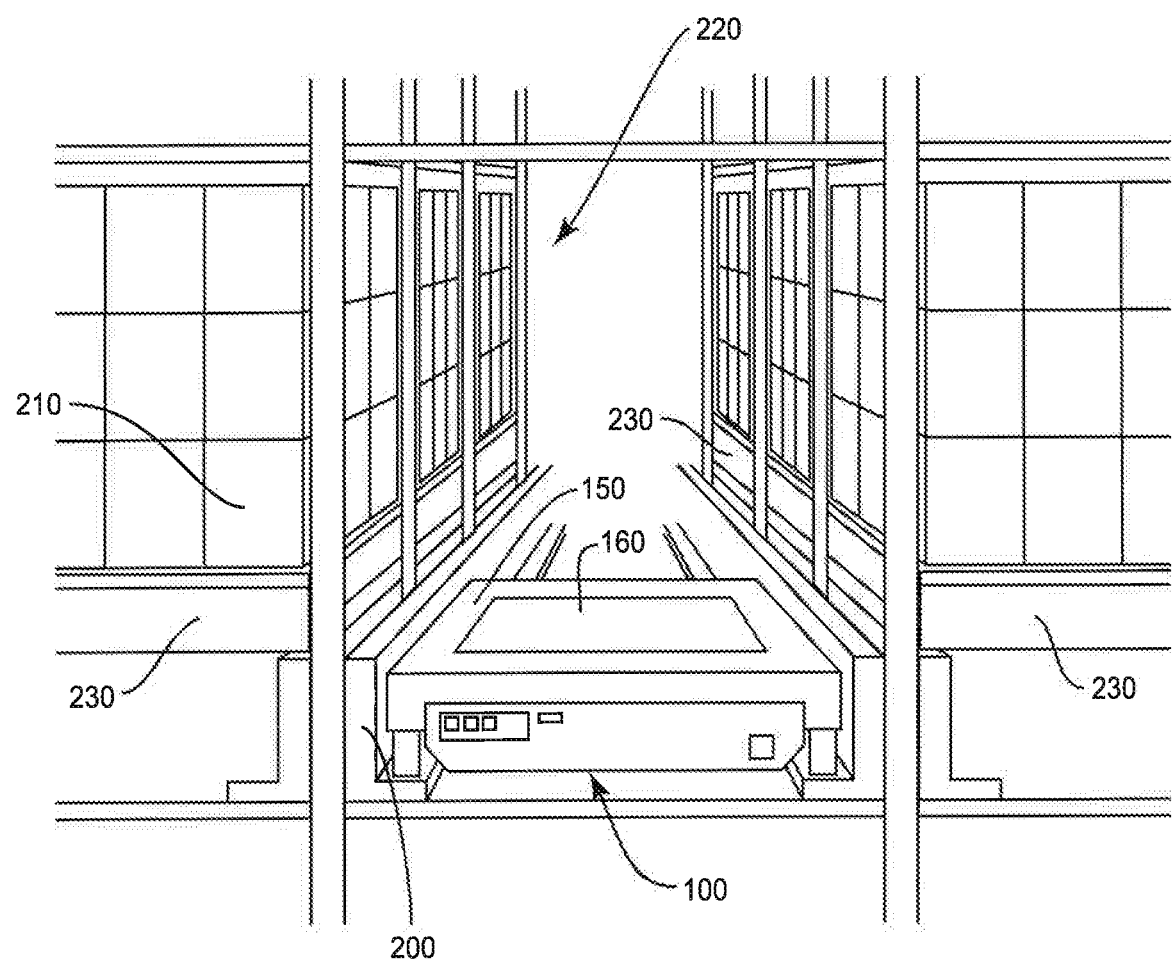
FIG. 4 is a perspective view of the pallet transportation cart of FIG. 1, in use in a warehouse, on a track.

Pallet transportation cart 100 can advantageously include a Programmable Logic Controller. Referring to FIG. 3, pallet transportation cart 100 includes a central processor 510, which can electrically couple to a transceiver 520. Transceiver 520 can emit an RF, Bluetooth or other signal to communicate with a device associated with pallets 230 or cartons 210 and obtain information regarding inventory. This information is received by transceiver 520 and stored in a read/write or read only memory unit 530. Memory 530 can be a flash drive, a hard drive and other magnetic, optical or other storage media. In addition, various instructions and data can be programmed into processor 510, through an input 540. Input 540 can be a keyboard, push buttons, switches, a data port or a signal receiver and the like.

Instructions can also be transmitted to pallet transportation cart 100 by sending a signal from a user's transceiver 550. Information can be collected by sending an appropriate signal to transceiver 520 and reading information from memory 530. Alternatively, pallet transportation cart 100 can include an output 560 from which information can be read. Output 560 can be an LCD or LED display, lights, a counter wheel or a data port. Other hardware for inputting instructions to processor 510 will be evident to those of ordinary skill in the art One or more electromagnets can be controlled with an electromagnet activation device 570, which can be controlled with input 540 or transceiver 550. In one embodiment of the invention, electromagnet activation device 570 can activate the electromagnets through automatic detection of a forklift or the manual activation of a switch.

Figure 6:
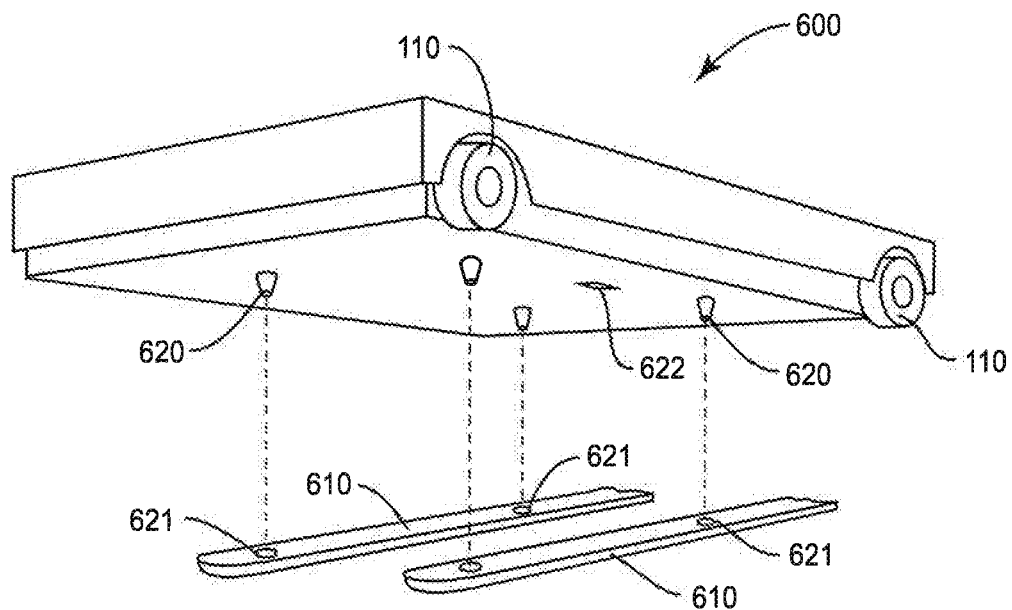
FIG. 6 is a bottom perspective view of a pallet transportation cart, in accordance with another preferred embodiment of the invention.
Figure 7:
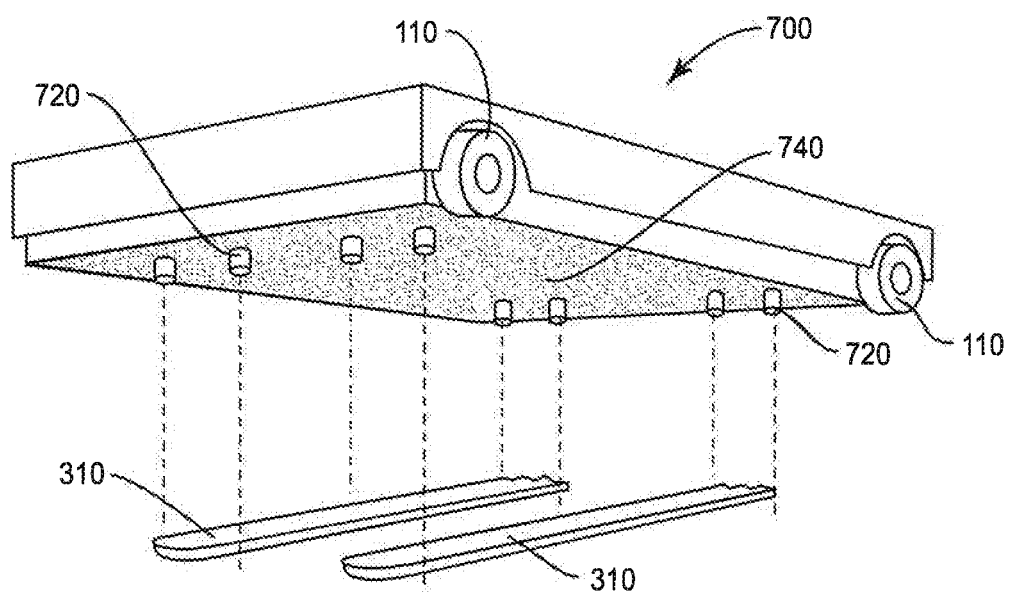
FIG. 7 is a bottom perspective view of a pallet transportation cart, in accordance with another preferred embodiment of the invention.

Referring to FIG. 6, a pallet transportation cart 600 in accordance with another embodiment of the invention is provided with engagement pegs 620, which can be permanent or which can retractably descend from the bottom of cart 600. Pegs 620 can engage with corresponding structures, such as a plurality of recesses 621 formed in a tine 610 of a forklift fork. Pegs 620 are preferably conical, with rounded tips, to make engagement with recesses 621 easier.

Pallet transportation cart 600 also includes a pressure sensitive button 622, to detect fork tines 610. Button 622 can activate the lowering of pegs 620. A similar optical sensor can serve the same function. Similar activation devices can cause the electromagnets of pallet transportation cart 100 to activate and can be used with other embodiments of the invention. A manual button can be used to retract pegs 620 and deactivate the electromagnets.

In yet another embodiment of the invention, a pallet transportation cart 700 (FIG. 7) includes a plurality of engagement structures 720, which can optionally retractably descend from the bottom of cart 700 to be positioned on each side of each forklift fork tine 310. Alternatively, the engagement structures can be positioned on the outside of the tines only. This will prevent side-to-side slippage. By tilting tines 310 upward, gravity can keep cart 700 from accidentally slipping off the front ends of tines 310. In still another embodiment of the invention, a high friction material 740, such as rubber, silicone or otherwise, can be applied to the bottom of cart 700 to enhance the fractional engagement between cart 700 and tines 310. Engagement structures 620 or 720 can be manually or automatically activated, in the same manner as described above in connection with activation of the electromagnet.

Figure 8:
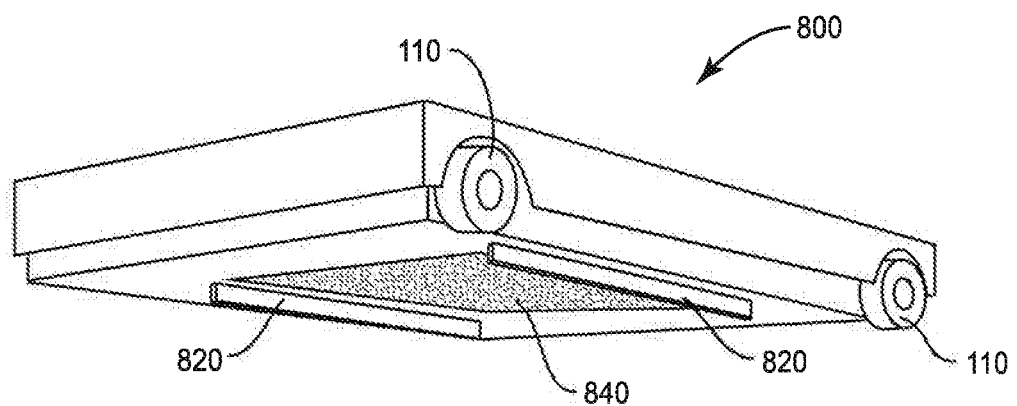
FIG. 8 is a bottom perspective view of a pallet transportation cart, in accordance with another preferred embodiment of the invention.

FIG. 8 depicts a pallet transportation cart 800, in yet another embodiment of the invention. Cart 800 includes a pair of ribs 820, which extends along the length of cart 800 and engage with a forklift fork, to prevent cart 800 from slipping sideways off the fork. Ribs 820 can be retractable or permanent. They are preferably over 6, preferably over 12 inches long. In one embodiment of the invention, ribs 820 are automatically retractable. In one embodiment of the invention, ribs 820 are constructed with a short height, so as not to interfere with movement of cart 800 along a track. In this embodiment of the invention, ribs 820 are no more than 1 inch in height. In another embodiment of the invention, ribs 820 can be constructed with a height greater than 1 inch, preferably 2 inches or more.

Cart 800 also includes a high friction surface 840, formed of rubber or some other material to provide a high friction interaction between the bottom of cart 800 and the tines of the forklift fork. The high friction surface can be applied to the bottom of any of the pallet transportation carts in accordance with the invention.

Figure 9:
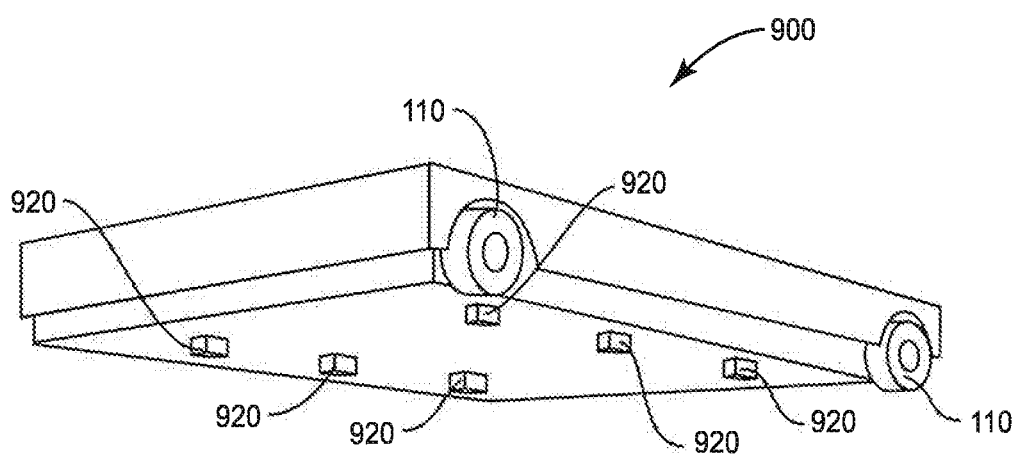
FIG. 9 is a bottom perspective view of a pallet transportation cart, in accordance with another preferred embodiment of the invention.

FIG. 9 depicts yet another embodiment of the invention, wherein ribs 820 are segmented into a plurality of posts, which can be retractable or permanent and can have dimensions, in aggregate, similar to ribs 820.

In other embodiments of the invention, the bottom of cart 100, 600 or 700 can be provided with straps or other structures to prevent the cart from sliding off the forklift during transportation.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. An automated pallet cart configured to be transported on a pair of tines extending in a first direction from a base of a forklift fork, the pallet cart comprising:
 a chassis supporting a battery, a motor, and a controller adapted to receive and transmit electronic signals, the chassis adapted to transport pallets of goods through a warehouse, the chassis having a longitudinal axis defining a forward and a backward longitudinal direction along the longitudinal axis, the chassis adapted to travel through a warehouse past a collection of pallets of cartons on storage racks;
 an automatically activated retention device on the chassis that in the activated condition, resists movement of the cart along the longitudinal axis in the first direction away from the base of said fork, the retention device comprising an electromagnet adapted and positioned to electromagnetically adhere to and secure the pallet cart to said tines with electromagnetic attraction, the retention device adapted to automatically activate the electromagnet when the tines are positioned under the pallet cart.

2. The pallet cart of claim 1, wherein the retention device is adapted to automatically deactivate the electromagnet to release the tines of the forklift fork.

3. The pallet cart of claim 1, wherein the electromagnet is adapted to provide sufficient magnetic attractive force such that when an underside of the pallet cart is in contact with the tines of a forklift fork having smooth steel tines, the electromagnet provides sufficient electromagnetic attraction to the tines for the electromagnetic attraction to retain the pallet cart to the tines, without slippage, when the tines are stationary and inclined at an angle of at least 10° to horizontal.

4. The pallet cart of claim 1, wherein the electromagnet is adapted to provide sufficient magnetic attractive force such that when an underside of the pallet cart is in contact with the tines of a forklift fork having smooth steel tines, the electromagnet provides sufficient electromagnetic attraction to the tines for the electromagnetic attraction to retain the pallet cart to the tines, without slippage, when the tines are stationary and inclined at an angle of at least 20° to horizontal.

5. The pallet cart of claim 1, comprising a sensor electrically coupled to the electromagnet and adapted to activate the electromagnet when the cart is engaged by the tines of a forklift fork.

6. The pallet cart of claim 5, wherein the sensor is an optical sensor.

7. The pallet cart of claim 5, wherein the sensor is a magnetic sensor.

8. The pallet cart of claim 1, wherein the retention device includes structures extended from the chassis and adapted to engage with the tines of said forklift fork.

9. The pallet cart of claim 8, wherein the structures are retractable.

10. The pallet cart of claim 8, wherein the structures are pegs adapted to engage recesses in the tines.

11. The pallet cart of claim 1, comprising a high friction material on a bottom of the chassis, adapted to increase the frictional engagement between the pallet cart and the fork tines as compared to a cart without the high friction material.

12. The pallet cart of claim 1, including a platform located at the top of the housing, adapted to raise up directly above the chassis and support a pallet directly above the cart.

13. The pallet cart of claim 1, wherein the pallet cart includes plural electromagnets extendably housed in a recess in the cart and biased into the recess to an extent that when activated and a forklift fork engages the cart, the magnets will extend from the recess from the magnetic attractive force to the forklift fork.

14. The pallet cart of claim 1, wherein there are two rows of electromagnets along the longitudinal axis of the pallet cart, spaced to align with the tines of a forklift fork.

15. An automated pallet cart, comprising:
a chassis supporting a battery, an internal motor and a controller adapted to receive instructions and transmit electronic control signals, the chassis adapted to transport pallets of goods through a warehouse, the chassis having a longitudinal axis defining a forward and a backward longitudinal direction along the longitudinal axis and left-side and right-side wheels on the left and right sides of the chassis, the wheels adapted to transport the pallet cart, the chassis configured to permit the pallet cart to be transported on a pair of tines extending in a first direction from a base of a forklift fork
a selectively activatable retention device, in addition to and mounted to the chassis, that in an activated state, extends downward from the bottom of the chassis and is adapted to engage with the tines and resist movement of the pallet cart with respect to the fork along the longitudinal axis in the first direction and retain the pallet cart to said tines, and in a non-activated state does not act to retain the pallet cart to said tines.

16. A method of transporting a pallet cart through a warehouse past pallets of goods stored on racks, comprising the steps of:
automatically securing the pallet cart of claim 1 to the tines of a forklift fork with the electromagnet; and
transporting the pallet cart with the forklift to another location within the warehouse, while the pallet cart is secured to the fork by the electromagnet.

17. The method of claim 16, wherein the pallet cart comprises two rows of electromagnets along the longitudinal axis of the cart, spaced to align with the tines of the forklift fork and the pallet cart is secured to the fork by magnetic attraction to the tines of the fork, and the electromagnets provide sufficient electromagnetic attraction to the tines for the electromagnetic attraction to retain the pallet cart to the tines, without slippage, when the tines are stationary and inclined at an angle of at least 10° to horizontal.

18. The method of claim 16, wherein the cart is secured to the fork by structures extending from the pallet cart to engage with the fork.

19. The method of claim 16, wherein the pallet cart is moved to a new location, the cart is placed on a track at the new location and the retention device is automatically deactivated.

20. The method of claim 16, wherein the retention device is activated automatically by engaging the fork with the pallet cart.

21. The method of claim 17, wherein the pallet cart includes a pallet lifting device to raise pallets above the cart, and the pallet cart is placed on a track extending through the warehouse, sending the cart a signal identifying a pallet of goods on the warehouse, relocating the cart to a location under the pallet, lifting the pallet with the pallet lifting device of the cart and transporting the pallet, with the cart, to another location in the warehouse.

* * * * *